(12) United States Patent
Riddle (10) Patent No.: US 7,012,900 B1
(45) Date of Patent: Mar. 14, 2006

(54) METHOD FOR MEASURING NETWORK DELAY USING GAP TIME

(75) Inventor: Guy Riddle, Los Gatos, CA (US)

(73) Assignee: Packeteer, Inc., Cupertino, CA (US)

(*) Notice: Subject to any disclaimer, the term of this patent is extended or adjusted under 35 U.S.C. 154(b) by 873 days.

(21) Appl. No.: 09/935,996

(22) Filed: Aug. 22, 2001

(51) Int. Cl.
*G08C 13/00* (2006.01)

(52) U.S. Cl. ............... 370/252; 370/503; 370/508; 370/516; 370/519

(58) Field of Classification Search ........... 370/252, 370/352, 508, 503, 516, 519; 709/233, 234
See application file for complete search history.

(56) References Cited

U.S. PATENT DOCUMENTS

| | | | |
|---|---|---|---|
| 5,815,667 A * | 9/1998 | Chien et al. ............... | 709/232 |
| 6,445,681 B1 * | 9/2002 | Pogrebinsky ............... | 370/252 |
| 6,512,761 B1 * | 1/2003 | Schuster et al. ............ | 370/352 |
| 6,769,029 B1 * | 7/2004 | Seki et al. .................. | 709/232 |
| 6,807,159 B1 * | 10/2004 | Shorey et al. .............. | 370/318 |
| 2003/0016630 A1 * | 1/2003 | Vega-Garcia et al. ....... | 370/252 |

* cited by examiner

*Primary Examiner*—Wellington Chin
*Assistant Examiner*—Kevin Mew
(74) *Attorney, Agent, or Firm*—Mark J. Spolyar (57) ABSTRACT

Methods, apparatuses and systems directed to measuring delay attributable to a network. The network delay is computed, in one implementation by determining a round-trip time for a network connection based on the arrival times of selected packets transmitted by first and second endpoints to establish the network connection, measuring the time gaps between consecutively increasing data packets in an ordered packet stream associated with a transaction, comparing the measured time gaps to the round-trip time, and computing a network delay for the transaction by adding the round-trip time to the measured time gaps that exceed the round trip time.

11 Claims, 6 Drawing Sheets

METHOD FOR MEASURING NETWORK DELAY USING GAP TIME

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to the field of network administration; more particularly, the present invention relates to measuring network delay.

BACKGROUND

Services delivered by providers of networked application services, by their nature, span a variety of provider and customer owned and managed infrastructures. For example, the application services begin at a provider or customer owned hosting platform within a provider or customer owned data center infrastructure, travel across one or more wide-area networks (WANs) owned and managed by one or more service providers and across one or more customer owned WAN and LAN infrastructures, before reaching a customer-owned desktop or mobile computing platform.

In order to provide the most effective service, it is often required that a network application service providers keep track of the delay within the network. Typically, network delay is measured based upon a transaction oriented measurement methodology. For example, a total delay is measured from the time a request is transmitted from a client until the last portion of the response is received back from a server. The total delay includes a server delay and a network delay.

The server delay corresponds to the time a request is received by the server until the time the server begins to transmit the last portion of the response back to the client. Conventionally, the network delay is the difference between the total delay and the server delay. The problem with using a transaction oriented measurement scheme is that the network delay may have a high magnitude in some instances where there are no problems with the network.

For instance, there may be a first transaction where the total delay is sixty-five seconds, where five seconds (of the sixty-five seconds) are attributed to server delay (e.g., time required to begin transmission of one megabit file). In such an instance, the network delay would be sixty seconds. A second transaction may also have a sixty-five second delay. In the second transaction, the server delay may again be five seconds, and the network delay sixty seconds. However, in this transaction, the server transmitted a 100 Kb file ten times due to retransmissions, thus accounting for the 60 second network delay. Both the first and second transactions have the same values for the total, server and network delays, even though there are no abnormalities with the first transaction and severe network problems during the second transaction. Therefore, what is desired is a more accurate method for measuring network delay.

SUMMARY

According to one embodiment, a network is disclosed. In one embodiment, the network comprises a client, a server, and a network device coupled to the client and the network. The network device determines the network delay of a connection between the client and server, where the network delay measurement includes time received at the network device from the client and server associated with one or more gaps of time between consecutive packets in an ordered stream of packets during which lost, delayed, or retransmitted packets occur.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method for measuring network delay is described. In one embodiment, the method comprises monitoring a network connection for packet traffic after the connection has been initialized and the initial network delay (e.g., round-trip time (RTT)) for a connection has been calculated. Once packets are received, a measurement engine in a network device uses a timer to measure the time gap between consecutively numbered packets that have one or more lost, delayed, or retransmitted packets between them. In one embodiment, the measurement engine measures the time gaps between consecutively numbered packets in both directions (e.g., from a client to a server and from the server to the client) of the transaction. The measured gap is compared to the basic round-trip time (RTT) for a transaction measured during initialization of the connection (or at some previous time).

The RTT is equal to the summation of two half round trips. The first half-round trip corresponds to the total time from a client to a network device located between the two and back to the client. The second half-round trip time corresponds to the total time from the network device to a server and back to the network device. In one embodiment, the network device is a performance monitoring device, such as, for example, a PacketShaper™ of Packeteer, Inc. of California. If the measured gap in time between consecutive data packets in a connection is larger than the previously calculated RTT, the gap is added to the network delay. This may be done for any number of gaps. The new value for the network delay is stored at the end of the transaction and reported to the network administrator.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
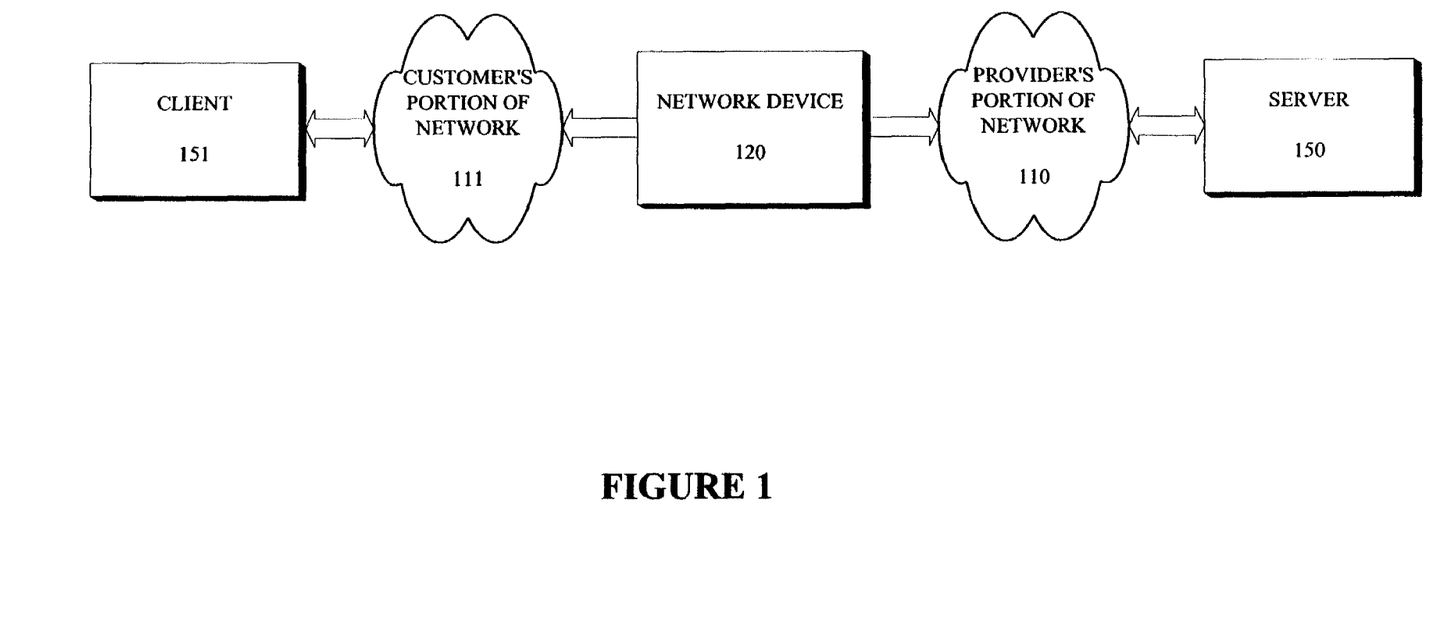
FIG. 1 illustrates a network environment.

FIG. 1 illustrates one embodiment of a network environment. Referring to FIG. 1, the network environment includes a provider portion 110 of the network and a customer portion 111 of the network. Provider portion 110 of the network couples one or more servers (e.g., server 150) to the network, while client portion 111 of the network couples one or more clients (e.g., client 151) to the network. Note that the techniques of the present invention are not limited to a network that includes client and provider portions.

Network device 120 monitors application performance using delay metrics that characterize the delay associated with end-to-end traffic in the network. Such traffic may be that of, for example, interactive applications that are operating with requests and responses to those requests traversing the network.

In one embodiment, network device 120 includes a measurement engine to record and maintain statistics and an on-board database to store information indicative of delays occurring in the network. The measurement engine may perform measurements and record information on traffic type specific network delays, server delays, packet counts, byte counts, bits per second, lost packets, retransmission count, end-to-end delays, etc. The measurement engine may comprise hardware, software or a combination of both.

Network device 120 may also include management control that accesses the on-board database to determine whether a performance problem exists in the network. The management control may identify such a problem because a measurement taken by the measurement engine exceeds a predetermined value. In one embodiment, the management control may create histograms to provide a graphical representation of delays (e.g., average delays, cumulative delays, etc.).

If a problem is determined to exist, then the management control may notify the application service provider. In one embodiment, in response to the notification, the application service provider may send an event to notify the customer of the problem and/or offer a service that fixes or alleviates the problem. In an alternative embodiment, the management control sends the event to the customer.

Figure 2:
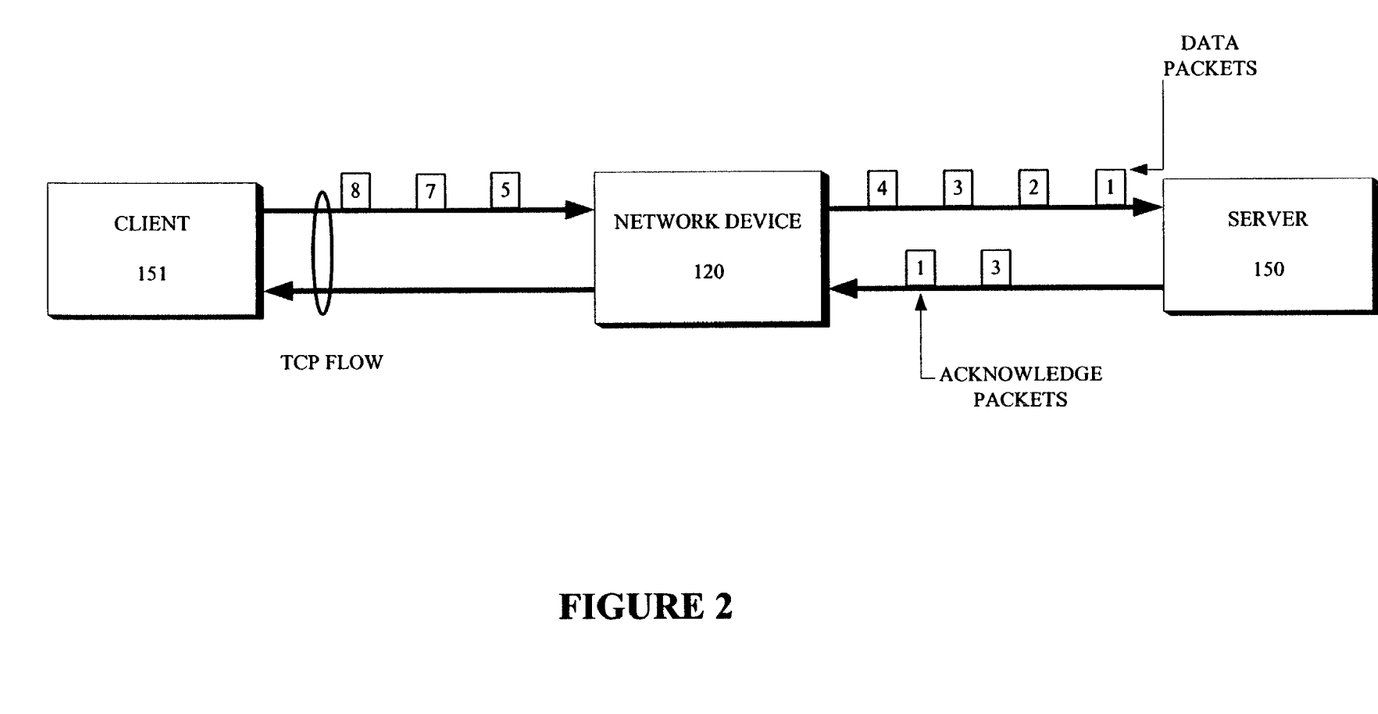
FIG. 2 is an alternative view of FIG. 1.

FIG. 2 is an alternative view of FIG. 1. Referring to FIG. 2, network device 120 monitors the Transmission Control Protocol (TCP) flows that traverse the network between client 151 on the customer side of the network and server 150 on the provider side of the network. With TCP traffic, there are a series of data packets flowing in both directions. Such traffic flows are common, particularly with respect to web-based applications. The flows are such that data packets travel in one direction while acknowledgement packets flow in the other direction. Some acknowledgement packets may include data that is traveling in the other direction and vice versa.

The RTT equals the client RTT (CRTT) plus the server RTT (SRTT). The CRTT corresponds to the time from client 151 to network device 120 and back again for a small packet such as the SYN packet used to start a TCP connection. The SRTT corresponds to the time from network device 120 to server 150 and back again.

In one embodiment, each of the data packets has sequence numbers, which are indications of have many bytes have been transferred since the beginning of the connection where an "initial sequence number" was negotiated (which is not usually 0). The sequence numbers are usually in increasing order, except where there has been a retransmission or packets are arriving out-of-order. The sequence numbers used in FIG. 2 are not actual sequence numbers. Instead, for purposes of explanation, a simplified set of numbers have been used.

FIG. 2 shows data packets 1, 2, 3, and 4 traveling through network device 120 to server 150 (in that order) with associated acknowledgment packets 1 and 3 traveling from server 150 towards network device 120. (Note that there are no acknowledgement packets for packets 2 and 4 as acknowledgement packets may not be generated for all data packets in a TCP-based network.) Also, packets 5, 7 and 8 travel from client 151 towards network device 120 on the way to server 150. There is no packet 6 to indicate that packet 6 has been lost.

Calculating Delays

As described above, the network device tracks the course of a client-server transaction and uses information about a TCP connection to differentiate one portion of an exchange from another. To understand the calculation of delays, a description of a transaction in a timing diagram illustrating the course of a network transaction over time is given in FIG. 3. Arrows indicate packets traveling over the network between client (e.g., client 151) and server (e.g., server 150) via packet shaper 303. Time increases while descending down the diagram, with successive event times noted as Tn (e.g., T1 representing the first event and T22 representing the last event).

According to one embodiment, the normal delays between a client, a server and the network device is determined during the initial connection between the client and server. A connection starts when a server receives a synchronize/start (SYN) packet from a client and sends back a synchronize acknowledge (SYN ACK). The destination host must then hear an acknowledge (ACK) of the SYN ACK before the connection is established. This is referred to as the "TCP three-way handshake."

Figure 3:
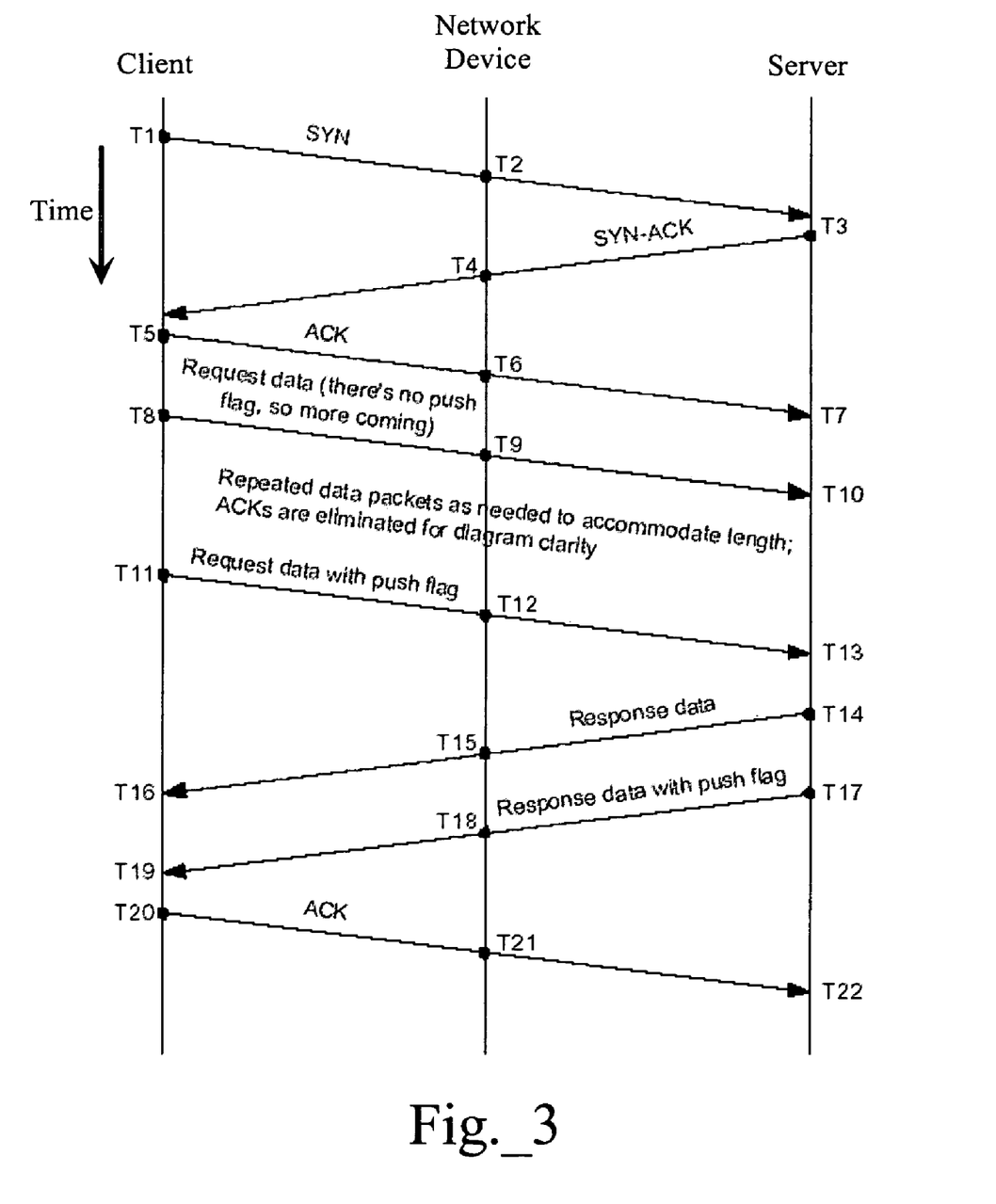
FIG. 3 is one embodiment of a timing diagram illustrating the course of a network transaction over time.

Referring to FIG. 3, a client initiates a server connection by transmitting a SYN packet at time T1. At time T2, the network device receives the SYN packet and passes the SYN packet to the server. The server responds with a SYN ACK packet at time T3. The network device receives the SYN ACK packet at time T4 and passes it along to the client. According to one embodiment, the TCP stack at the server responds with the SYN ACK packet very rapidly. Thus, the SYN ACK packet follows the SYN packet almost instantaneously. As a result, time T4 minus time T2 gives an accurate measure of the round-trip network delay between the network device and the server. This quantity (T4–T2) is referred to as the server round trip time (SRTT).

The client receives the SYN ACK packet at time T5 and issues the final ACK packet of the three-way handshake. At time T6, the network device receives the ACK and passes it to the server. In one embodiment, no processing transpires between the client's receipt of the SYN ACK packet from the server and the ACK packet at time T5. Accordingly, T6 minus time T4 provides an accurate measure of the round-trip time between the client and the network device (CRTT). This quantity (T6–T4) is referred to as the client (CRTT).

Putting together the server and the client round trip times (SRTT+CRTT) provides the total round-trip time or RTT for the path between the client and server. According to one embodiment, the delay values calculated during initialization are stored at measurement engine 704.

After the initialization stage, a client initiates a request at time T8. The network device receives the request at time T9. At time T10, the initiating request packet is received at the server. In order to best illustrate the present invention, FIG. 3 does not show the acknowledge signals transmitted by the server to the client. In one embodiment, large requests are divided into multiple packets. Therefore, in a large request, packets are continuously transmitted from the client until the final request packet has been transmitted.

At time T11, the last request packet is transmitted with an indication (e.g., a bit set) that the packet is the final packet of the request. The final request packet is received at the network device at time T12. In a further embodiment, the network device notes the time at which the final packet has been received.

At time T13, the final request packet is received at the server. As a result, the server assembles the request, processes the request and assembles the response. At time T14, the server transmits the first of potentially numerous response packets. Note that time T14 minus time T13 (T14–T13) is the actual time required by the server to process to process the request received from the server. However, the network device is not aware of this processing time. At time T15, the network device receives the first response packet from the server. The network device knows that the server's processing time occurred after the network device received the last request packet and before the network device received the first response packet (e.g., T15–T12).

In addition, the network device recognizes that another component of the interval was the transit time from the network device to the server, and back again. The network device has the transit time from the network device to the server, and back, stored in measurement engine 704 as the SRTT. According to one embodiment, there is a small magnitude of time required to serialize bits in the response packets, as well as for preparing the packets for their bit stream. Note that this time was not calculated during the initialization stage since the SYN and ACK packets are relatively small.

Accordingly, the value for [(T15–T12)–(SRTT)] is the server delay (SD).

In order to calculate the total delay in the network, the termination of a transaction is significant. However, it is not always obvious when a transaction ends in the network. The combination of a flag bit within a final packet transmitted by the server and the corresponding acknowledge from the client typically signal the completion of a transaction. However, long transactions typically insert the flag bit throughout the transaction.

According to one embodiment, the network device uses a timer to track transactions, in addition to monitoring flag bits. In one embodiment, the network device and timer operate according to the following rules. If a flag bit indicates a transaction's end, but the server continues to transmit data, the timer continues to advance. Further, if a client transmits a new request, the network device terminates the previous transaction and records the last recorded time. In addition, if there is no activity from either the server or the client when the timer expires, the network device considers the transaction complete and records the last noted time. Whenever a connection ends, the network device observes a session termination packet (e.g., a FIN packet) and records the last noted time.

Using the above-mentioned system, the network device recognizes the last response packet at time T18. Accordingly, the network device makes sure that it has observed all of the required acknowledge packets for the request packet, and verifies that the last response packet actually represented the end of the transaction. The client receives the final response packet at time T19. At time T20, the client transmits an acknowledge packet.

At time T21, the acknowledge packet reaches the network device. The client's perspective of the total delay begins with transmitting the first request packet (e.g., at T8) and finishes with the receipt of the final response packet (e.g., at T20).

Meanwhile, the network device observes the total delay as time T9 until time T21. Thus, the total delay (TD) is equivalent to [(T21−T9)].

Once the network device has calculated the server delay and the total delay, it can calculate the amount of time the transaction spent in transit. This time is equivalent to the raw network delay (RND), which is equivalent to [TD−SD].

Notice that the RTT is the transit time for one round trip, while the raw network delay reflects all of the transit time for the transaction. For example, if the transaction is large, multiple packets need to be transmitted to and from the server. The raw network delay includes the transmission time for large transactions. The raw network delay is not necessarily an even multiple of the RTT since multiple packets are not transmitted consecutively. Instead, multiple packets tend to overlap.

Gap Inclusion

The raw network delay calculated above and reported by prior art implementation is really not a good indication of problems in the network. A large component of it is simply the transmission time necessary to send the bytes through the wide area network and is proportional to the size of the transaction. To make the "network delay" number a better diagnostic tool to actually indicate problems in the network, the total delay is redefined to be server delay plus network delay plus normal transmission time (SD+ND+NTT) and the revised network delay is calculated as follows.

Whenever the network functions normally, transmissions between a client and server should have a network delay comparable to the value calculated for RTT as described above. While operating normally, the client transmits request data packets in an orderly stream, with an equivalent amount of spacing between each packet. Similarly, response data packets transmitted from the server are transmitted back to the client in an orderly stream.

However, if a problem exists in the network (e.g., packets are being lost), packets may have to be retransmitted. The network device may observe an extraordinarily large gap in a packet stream if there are problems with the network. For example, the network device may recognize that a packet stream has been stopped for a time, or that duplicate packets have been received.

Figure 4:
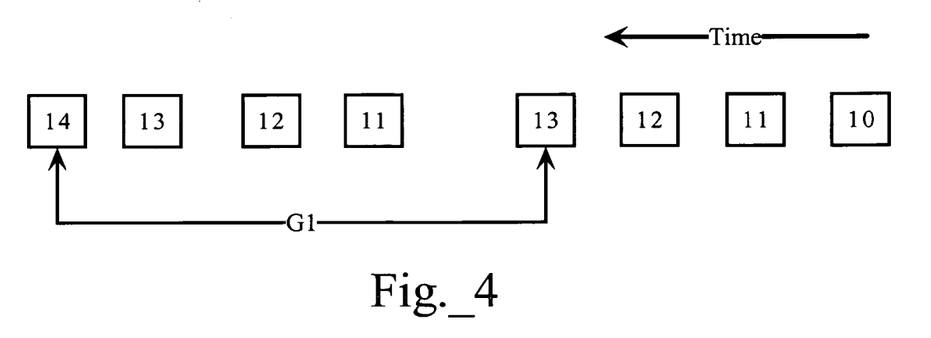
FIG. 4 illustrates one type of a packet gap.

FIG. 4 illustrates one embodiment of a packet gap. FIG. 4 shows packets 10–14 that are received at the network device during a transaction. In this case the network device sees duplicate packets in the packet stream. In this instance, the duplicate packets (e.g., packets 11–13) indicate that the original packets were lost after passing through the network device. The network device recognizes that the gap between packets 13 and 14 is larger than the ordinary gap between packets. In one embodiment, the network device measures the gap between packets 13 and 14 and stores the gap value (e.g., G1) in measurement engine 704.

According to a further embodiment, the measurement engine 704 compares the gap value to the value for RTT. If the gap value G1 is greater than the RTT value, the gap value G1 is added to the network delay and stored in measurement engine 704. In yet a further embodiment, notice is provided to the system administrator if one or more gap values continuously exceed a threshold.

Figure 5:
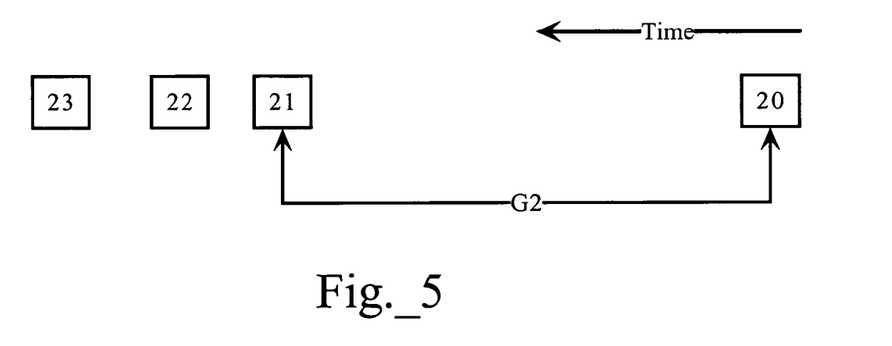
FIG. 5 illustrates another type of a packet gap.

FIG. 5 illustrates another embodiment of a packet gap. FIG. 5 shows packets 20–23 that are received at the network device during a transaction. The network device observes that there is a large gap between packets 20 and 21. In this case, it is likely that the original packet 21 is lost before arriving at the network device. The network device measures the gap between packets 20 and 21 and stores the gap value (e.g., G2) in measurement engine 704. Subsequently, the network device compares the gap value to the value for RTT. If the gap value G2 is greater than the RTT value, the G2 value is added to the network delay and stored in measurement engine 704.

Figure 6:
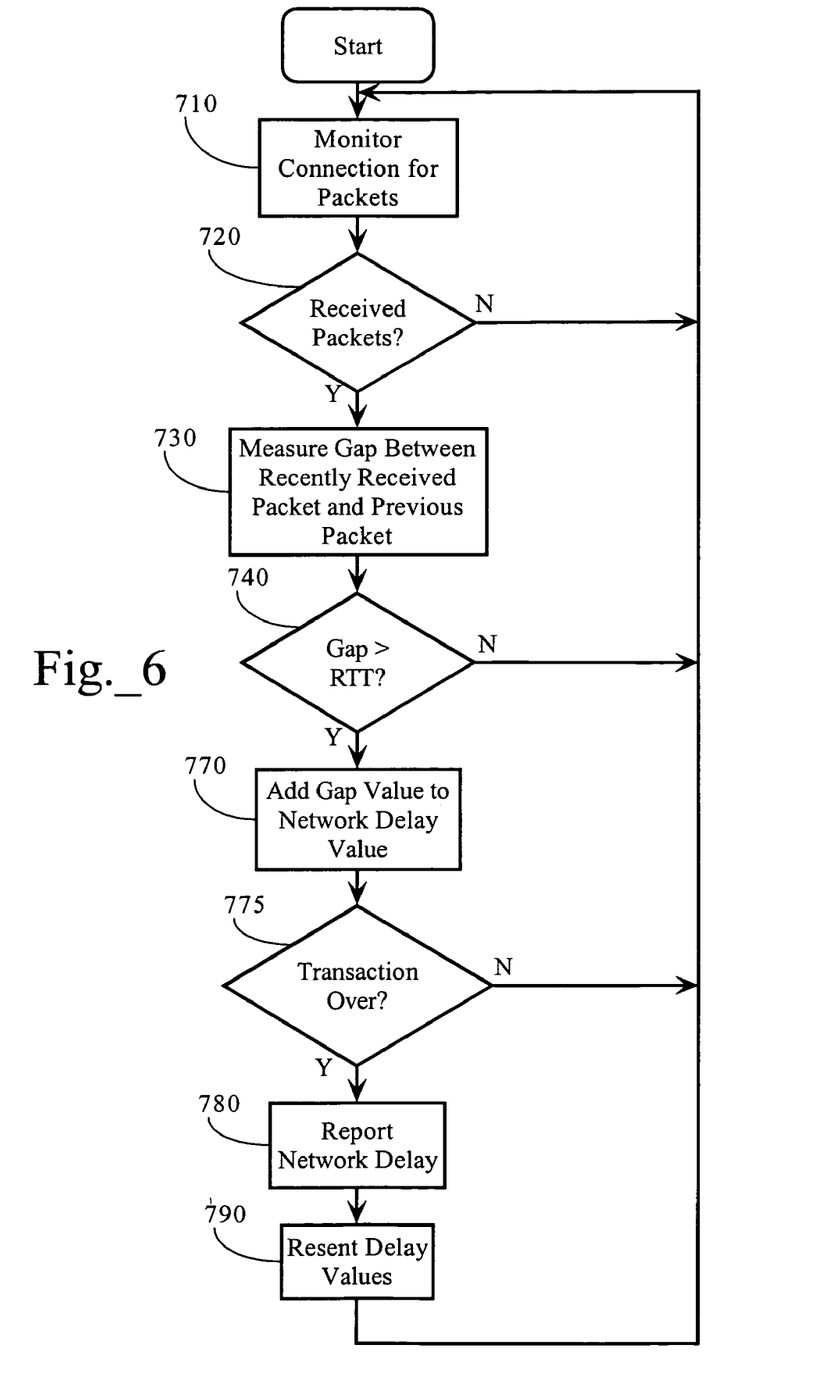
FIG. 6 is a flow diagram for one embodiment of measuring network delay.

FIG. 6 is a flow diagram of one embodiment for measuring network delay using gap inclusion. After the connection is initialized (e.g., the initial network delay equal to the RTT for a connection is calculated), the network device begins monitoring the connection for packet traffic, process block 710. At process block 720, it is determined whether a packet has been received at the network device.

If a packet has been received at the network device, the timer within the network device measures the time gap between the recently received packet and the previously received packet, process block 730. In one embodiment, duplicate packets are ignored, only recording the time for the first copy of a packet with a particular sequence number. Note that at the end of a previous transaction, the timer is reset and the timer does not begin measuring gaps until after the first packet of the next transaction has been received. In one embodiment, the timer measures the time gaps between the packets in both directions (e.g., from client to server and from server to client) of the transaction, however, the timer only measures the time gaps in only one direction at a time.

Subsequently, the measured gap is compared to the RTT measured during initialization. At process block 740, it is determined whether the measured gap is greater than the RTT. If the measured gap is smaller than RTT, control is returned to process block 710 where the network device continues to monitor packets.

If the gap value is greater than RTT, processing continues at processing block 770. At process block 770, the gap value is added to the network delay value for this transaction and in block 775 a determination is made as to whether the transaction is over (e.g., whether the complete request and response have been seen). If the transaction is not over, processing loops back to processing block 710. If the transaction is over, processing transitions to processing block 780. At process block 780, the new value for the network delay is stored and reported to the network administrator. At processing block 790, after reporting the network delay to the network administrator, the delay values are reset for the next transaction and processing transitions back to processing block 710. The gap inclusion method for measuring network delay enables the network device to inform an administrator that there may be problems with the network. For instance, in one embodiment, a graphical illustration may be generated that illustrates network performance over time.

Thus, the prior art computed the total delay (TD) according to the following equations:

$$TD=RND+SD$$

The present invention uses gap inclusion and computed the network delay (ND) according to the following equation:

$$ND=RTT+\text{Gaps}$$

Thus, the total delay is computed according to the following equation:

$$TD=ND+SD+NTT$$

and NTT is computed via $$NTT=TD-ND-SD.$$

One Embodiment of a Network Device

Figure 7:
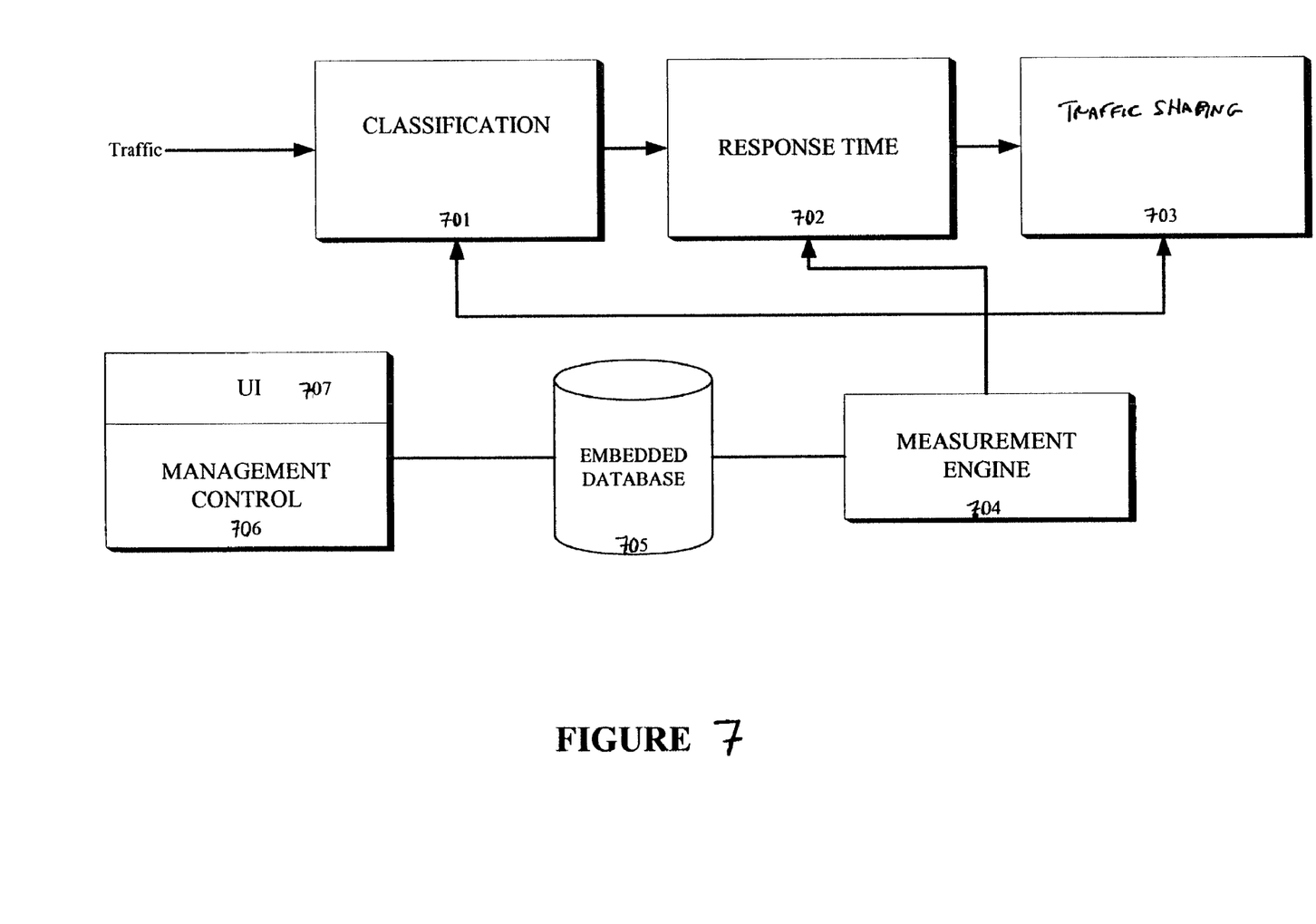
FIG. 7 is a data flow diagram of one embodiment of a network device.

FIG. 7 is a data flow diagram of one embodiment of a network device described herein. Referring to FIG. 7, a classification engine 701 classifies traffic in the traffic flow. Classification may be performed by using a classification tree. The traffic may be classified by all types of metrics. A classification model allows measurements of one type of traffic versus another type of traffic, one application versus another application, one customer versus another customer.

After classification, a response time block 702 monitors response time including the gap inclusion calculations of FIG. 6. Next, the traffic goes through traffic shaping block 703 that performs any necessary shaping on the traffic. According to one embodiment, traffic shaping block 703 tracks the course of a client-server transaction and uses information about a TCP connection to differentiate one portion of an exchange from another. For more information on packet shaping, see U.S. application Ser. No. 08/977,376, entitled "Method for Managing Flow Bandwidth Utilization at Network, Transport and Application Layers," filed Nov. 24, 1997, incorporated herein by reference and assigned to the corporate assignee of the present invention.

Once classified, measurement engine 704 records measurements such as network delay to make determinations on comparable amounts of bandwidth. Essentially, the data is gathered, classified (e.g., on a per class basis), and then measurements are taken and grouped with other measurements associated with the same classification (e.g., according to application, application subtype, customer, subnet, etc.).

Measurement engine 704 provides probes to each of these blocks and stores measurements in embedded database 705.

Management control 705 fetches values from the embedded database 705 and quantifies and qualifies performance of the network based on these values. The results of the performance may be displayed through user interface 707.

A diagnosis may also be based on detected variances in the network delay index (or other measure(s)) over time for the same network time period or variances in the network delay (or other measure(s)) between different types of traffic.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. In a network, a method for computing the delay attributable to a network, the method comprising
    determining a round-trip time for a network connection based on the arrival times of selected packets transmitted between first and second endpoints;
    measuring the time gaps between consecutively increasing data packets in an ordered packet stream associated with a transaction over the network connection between the first and second endpoints;
    comparing the measured time gaps to the round-trip time; and
    computing a network delay for the transaction by adding the round-trip time to the measured time gaps that exceed the round trip time.

2. The method of claim 1 wherein the round-trip time for the network connection is based on the arrival times of handshake packets transmitted by first and second endpoints to establish the network connection.

3. The method of claim 2 wherein the determining step comprises
    receiving, at a network device, a first handshake packet transmitted from a first host to a second host;
    recording the arrival time of the first handshake packet;
    receiving, at the network device, a second handshake packet, responsive to the first handshake packet, transmitted from the second host to the first host;
    recording the arrival time of the second handshake packet;
    receiving, at the network device, a third handshake packet, responsive to the second handshake packet, transmitted from the first host to the second host;
    recording the arrival time of the third handshake packet;
    computing the round trip time based on the difference between the arrival time of the first handshake packet and the third handshake packet.

4. The method of claim 2 wherein the determining step comprises
    receiving, at a network device, a first handshake packet transmitted from a first host to a second host;
    recording the arrival time of the first handshake packet;
    receiving, at the network device, a second handshake packet, responsive to the first handshake packet, transmitted from the second host to the first host;
    recording the arrival time of the second handshake packet;
    receiving, at the network device, a third handshake packet, responsive to the second handshake packet, transmitted from the first host to the second host;
    recording the arrival time of the third handshake packet;
    computing a first component round trip time based on the difference between arrival time of the first handshake packet and the second handshake packet;
    computing a second component round trip time based on the different between the arrival time of the second handshake packet and the third handshake packet; and
    adding the first and second component round trip times to yield the round-trip time for the network connection.

5. The method of claim 1 wherein the determining step comprises
    receiving, at a network device, a TCP SYN packet transmitted from a first host to a second host;
    recording the arrival time (T2) of the TCP SYN packet;
    receiving, at the network device, a TCP SYN/ACK packet transmitted from the second host to the first host;
    recording the arrival time (T4) of the TCP SYN/ACK packet;
    receiving, at the network device, a TCP ACK packet transmitted from the first host to the second host;
    recording the arrival time (T6) of the TCP ACK packet;

computing a first component round trip time based on the difference between the arrival time (T4) of the TCP SYN/ACK packet and the arrival time (T2) of the TCP SYN packet;

computing a second component round trip time based on the different between the arrival time (T4) of the TCP SYN/ACK packet and the arrival time (T6) of the TCP ACK packet;

adding the first and second component round trip times to yield the round-trip time for the network connection.

6. The method of claim 1 wherein the time gaps are measured only with respect to consecutively increasing data packets flowing in one direction.

7. The method of claim 1 wherein the time gaps are measured with respect to consecutively increasing data packets in both directions.

8. The method of claim 1 wherein the measuring step comprises recording packet arrival times for data packets corresponding to the transaction, wherein duplicate packets corresponding to the transaction are ignored; and comparing the packet arrival times between the consecutively increasing data packets.

9. The method of claim 1 further comprising computing a server delay for the transaction;

computing a total delay for the transaction.

10. The method of claim 9 further comprising computing a normal transmission time for the network connection based on the total delay minus the server delay and the network delay.

11. The method of claim 1 further comprising storing the network delay in a database.

* * * * *